United States Patent [19]

Gulick

[11] Patent Number: 5,483,577
[45] Date of Patent: Jan. 9, 1996

[54] SINGLE CHIP TELEPHONE ANSWERING MACHINE, TELEPHONE, SPEAKERPHONE, AND ADSI CONTROLLER

[75] Inventor: Dale E. Gulick, Austin, Tex.

[73] Assignee: Advanced Micro Devices, Inc., Sunnyvale, Calif.

[21] Appl. No.: 185,697

[22] Filed: Jan. 24, 1994

[51] Int. Cl.[6] .................................................. H04M 1/64
[52] U.S. Cl. .......................... 379/67; 379/357; 379/201; 379/88; 379/89
[58] Field of Search .................................... 379/357, 388, 379/389, 390, 420, 429, 201, 386, 88, 89

[56] References Cited

U.S. PATENT DOCUMENTS 5,329,579  7/1994  Brunson ..................................... 379/88

OTHER PUBLICATIONS

Bursky, Dave; *Standard-Cell Digital Chips Get More Support; Help is Coming from Libraries, Compilers, Synthesizers, Simulation Tools*, vol. 38, No. 12, p. 61, Electronic Design, Jun. 28, 1990.
Harold, Peter; *Core Microprocessors; EDN Special Report; Technical*, vol. 34, No. 3, p. 130, EDN Magazine, Feb. 2, 1989.
"Digital Is the Message on Answering Machines", Sandbank, Electronic Engineering Times, Sep. 27, 1993, pp. 69–70.
Matsuo et al., "Personal Telephone Services Using IC–Cards", IEEE Communications, Jul. 1989, pp. 41–48.

Primary Examiner—Jeffery A. Hofsass
Assistant Examiner—Scott Wolinsky
Attorney, Agent, or Firm—Foley & Lardner

[57] ABSTRACT

The invention provides a single chip digital answering machine, telephone, speakerphone and analog display services interface controller circuit. The invention includes a telephone controller including a controller which includes a memory interface for controlling storage in and retrieval of data from a memory; a single digital processor for converting the electrical signals representative of an audible input to digital data and for converting digital data to electrical signals representative of an audible output; a telephone line interface for coupling the digital signal processor to the telephone line and a user interface for coupling the telephone line interface to a speaker and a microphone. The controller, the digital signal processor, the telephone line interface and the user interface are all integrated within a common integrated circuit.

54 Claims, 3 Drawing Sheets

SINGLE CHIP TELEPHONE ANSWERING MACHINE, TELEPHONE, SPEAKERPHONE, AND ADSI CONTROLLER

BACKGROUND OF THE INVENTION

The present invention generally relates to a telephone controller for controlling a telephone and coupling the telephone to a telephone line. More particularly, the present invention relates to a circuit which is preferably fabricated in a single integrated circuit and provides the resources necessary to construct a telephone product that functions as a telephone, a digital answering machine, a speakerphone or ADSI controller. By integrating all of these resources into a single integrated circuit, and by providing these functions using a single digital signal processor, the present invention achieves unique economies not heretofore realizable.

Since telephone products such as telephones, answering machines and speakerphones are consumer products, they are particularly sensitive to issues of cost. Any telephone product which can be manufactured less expensively than other competing products, while providing the same or additional features, enjoys a significant commercial advantage over the competing products. Accordingly, in the design and development of components for telephone products, it is desirable to minimize the cost of such components, as well as the costs associated with manufacturing and interconnecting such components.

It is also desirable, in the design of components for telephone products, to provide as many functions and features as is economically feasible. Unique features provide an additional economic advantage over competing products. Moreover, the presence of multiple features in a single telephone product or in a component for a telephone product allows a manufacturer to provide a product line having a range of operational features simply by activating or deactivating these features. In this manner, a manufacturer can present a broad line of products while minimizing manufacturing costs. High end and low end products can be manufactured using identical components, with additional features activated in the high end products during manufacturing.

It is commercially desirable to combine into a single consumer telephone product most of the commonly available telephone features. Such a telephone product provides a telephone, a digital answering machine, and a speakerphone with ADSI capability. A telephone comprises, at a minimum, a handset including a microphone and an earpiece and a keypad for dialing. An electronic telephone may also need to generate a dial tone, busy tones and ringing tones. Accordingly, a digital signal processing means is needed in conjunction with a telephone for generating audible outputs including a dial tone, busy tones and ringing tones.

Analog Display Services Interface, or ADSI, is a standardized protocol for interfacing to a display-based telephone. The display-based phone is generally a plain old telephone set (POTS) with a character display, such as a liquid crystal display. The protocol supports a variable display size, up to a maximum of 33 lines by 40 characters. The phone also contains various "soft keys" which are programmable and analogous to the function keys on a personal computer keyboard. Under the ADSI protocol, data is transmitted to the phone, using the same line as voice transmissions. The data are encoded, for example, using frequency shift keying (FSK). The encoded data are received and decoded to form digital data. A portion of the data may be displayed on the display, while another portion of the data may control operation of the telephone, including programming the soft keys. Voice data may also be transmitted to provide audible prompting of the user. Responses from the telephone, including data from the programmable soft keys, are encoded using dual tone, multiple frequency (DTMF) codes, and conveyed over the same telephone line. Accordingly, a digital signal processor means is needed in conjunction with an ADSI controller to function as a modem for receiving and decoding the FSK data to digital data and for encoding digital data as DTMF tones.

A digital answering machine provides the same functionality as traditional tape answering machines but stores messages in solid state memory, rather than on magnetic tape. The elimination of mechanical parts needed for transporting the tape increases reliability over tape answering machines. Also, the integrated circuits necessary for implementing a digital answering machine require far less physical space than a tape answering machine. The digital answering machine stores one or more outgoing messages, and one or more incoming messages. The digital answering machine may also perform voice synthesis from data stored in memory. A synthesized voice message may be provided as a time and date stamp for recorded messages. To reduce physical memory requirements, voice data are preferably compressed for storage and decompressed for playback. The digital answering machine may be controllable by keypad entries received from the telephone keypad or by DTMF tones received from remote locations over the telephone lines. Accordingly, a digital signal processing means is needed in conjunction with a digital answering machine for converting an analog audible input to digital data and digital data to an analog audible output, converting DTMF codes to digital data, and performing the compression and decompression algorithms.

A speakerphone allows hands-free operation of a telephone. The speakerphone includes a speaker for converting electrical signals representative of speech to audible sound, and a microphone for converting an audible input such as speech to electrical signals. A control circuit monitors electrical signals supplied to the speaker and received from the microphone in order to independently activate either the speaker or the microphone. A speakerphone switch may be provided to activate the speakerphone microphone and speaker while deactivating the telephone handset microphone and earpiece. When used in combination with a digital answering machine, the speakerphone microphone may be employed for recording outgoing messages and the speakerphone speaker may be employed for playing back recorded outgoing messages or incoming messages. Accordingly, a digital signal processing means is needed for converting analog voice signals to digital data, comprising digital data, decompressing compressed digital data and converting digital data to voice signals.

Implementing a telephone controller requires an analog interface for coupling the telephone controller to the telephone line. The telephone line conveys telephone signals over two wires, commonly known as tip and ring. Telephone signals, including ringing signals, are standardized. The analog interface must receive analog input signals from tip and ring, supply analog output signals to tip and ring, receive audible input signals from a handset microphone, provide audible output signals to a handset earpiece, and provide sidetone. A sidetone path provides a portion of the outgoing voice signal to the handset earpiece to provide a more comfortable interface for the user.

As is apparent, considerable hardware is required when combining the structure necessary to perform the functions of a telephone, digital answering machine, speakerphone and ADSI controller. In particular, each of these devices requires a digital signal processor. Moreover, the functions performed by the different signal processors may need to be performed simultaneously, such as DTMF detection during analog-to-digital conversion and data compression. A control means such as a microcontroller is further needed for coordinating the different functions of the combined telephone product.

Moreover, for robustness, such a combined telephone product should provide more than one operating mode. Preferably, the product is operable from AC power supplied through a line cord. In the event of a power outage, the product should continue to provide telephone functions, powered from the telephone line. Since a digital signal processor and a microcontroller operate in response to a program of instructions, such a combined telephone product should include an in-circuit emulation mode for developing the program of instructions.

One known telephone product provides telephone and digital answering machine functions in five separate integrated circuits. One chip includes a voice processor; a second chip provides a codec, including analog-to-digital and digital-to-analog conversion; a third chip provides a data access arrangement for coupling to a telephone line; a fourth chip provides a microcontroller for the voice processor; and a fifth chip provides a microcontroller for the data access arrangement and the keyboard. This product requires at least two digital signal processors, one for the voice processor chip and one for digital-to-analog and analog-to-digital conversion and filtering.

Such a multiple chip design is expensive to implement in a consumer telephone product. Five different integrated circuits require substantial area or "real estate" on a printed circuit board. Them any interconnections between the devices add to manufacturing cost and time and reduce product reliability. A design which requires two digital signal processors requires development of two independent programs of instructions, adding to development time and cost. Moreover, the use of two digital signal processors is duplicative and inefficient, wasting energy and real estate.

Accordingly, there is a need in the art for a single integrated circuit device which combines the functions of a telephone controller, a digital answering machine controller, a speakerphone controller and ADSI. The present invention provides such a device and thereby provides unique cost and performance advantages not realizable by prior art devices. Integration within a single integrated circuit allows use of a single digital signal processor to control all of the functions of the telephone controller. The single chip integrates both digital and analog functions of the controller, thus reducing noise on analog signal paths and subsequent inaccuracies in digital signals. Integration into a single integrated circuit requires fewer parts to implement a telephone product which combines all these features, and therefore fewer interconnections. This reduces manufacturing costs and improves reliability. Moreover, use of a single chip reduces power consumption, since high-power output circuits needed to drive signals between discrete integrated circuits are not necessary. Also, use of a single integrated circuit allows on-chip control of functions such as signal attenuation and filtering, ring detection, and off-hook detection, as well as different modes of operation, such as active mode, low power shutdown mode, and in-circuit emulation mode.

SUMMARY OF THE INVENTION

The present invention provides a telephone controller for controlling a telephone and coupling the telephone to a telephone line. The telephone includes a memory, speaker means for providing an audible output, and microphone means for receiving an audible input. The telephone controller comprises control means including a memory interface means for controlling storage in and retrieval of data from the memory, the memory interface means being coupled to the memory by a memory bus, the memory interface means being coupled to an interface bus. The telephone controller further comprises a digital signal processor for converting electrical signals representative of an audible input to digital data and for converting digital data to electrical signals representative of an audible output, the digital signal processor being coupled to the interface bus for communicating the digital data with the memory interface means. The telephone controller still further comprises telephone line interface means for coupling the digital signal processor to the telephone line for conveying the electrical signals representative of the audible input and audible output between the telephone line and the digital signal processor, for conveying the electrical signals representative of the audible input from the digital signal processor to the speaker means, and for conveying the electrical signals representative of the audible input from the microphone means to the digital signal processor. The telephone controller still further comprises user interface means for coupling the telephone line interface means to the speaker means and the microphone means. The control means, the digital signal processor, and telephone line interface means, the user interface means and the interface bus are integrated in a common integrated circuit.

The invention further provides an integrated telephone controller for coupling a telephone to a telephone network and providing a digital answering machine adapted for storing a compressed digital outgoing message and one or more compressed digital incoming messages. The telephone network communicates electrical signals including incoming electrical signals and outgoing electrical signals. The telephone has microphone means including a handset microphone for converting an audible input to the outgoing electrical signals and speaker means including a handset earpiece for converting the incoming electrical signals to an audible output. The telephone includes memory means having a multiple bit port, the memory means storing the compressed digital outgoing message and the one or more compressed digital incoming messages. The integrated telephone controller comprises telephone network interface means for coupling the telephone controller to the telephone network, the telephone network interface means including telephone network receiver means coupled to the telephone network for receiving the incoming electrical signals from the telephone network and telephone network transmitter means coupled to the telephone network for transmitting the outgoing electrical signals to the telephone network.

The integrated telephone controller further comprises handset interface means including earpiece driver means coupled between the telephone network receiver means and the handset earpiece for conveying the incoming electrical signals to the handset earpiece, and handset microphone receiver means coupled between the handset microphone and the telephone network transmitter means for conveying the outgoing electrical signals to the telephone network transmitter means. The integrated telephone controller still further comprises a processor including first analog-to-digital converter means coupled to a telephone network receiver means for receiving the incoming electrical signals from the telephone network receiver means and converting the incoming electrical signals to digital incoming signals, compression means for compressing the digital incoming signals to produce compressed digital incoming signals, decompression means for decompressing compressed digital outgoing signals to produce digital outgoing signals, and first digital-to-analog converter means coupled between the decompression means and the telephone network transmitter means for converting the digital outgoing signals to the outgoing electrical signals and conveying the outgoing electrical signals to the telephone network transmitter means, the processor having a multiple-bit port for receiving the compressed digital incoming signals and for transmitting the compressed digital outgoing signals.

The integrated telephone controller still further comprises control means including memory interface means having a multiple-bit port coupled to the processor multiple-bit port, the memory interface means for receiving the compressed digital incoming signals, combining the compressed digital incoming signals to form the one or more compressed digital incoming messages, and storing the one or more compressed digital incoming messages in the memory means, and receiving the compressed digital outgoing message from the memory means, forming the compressed digital outgoing signals from the compressed digital outgoing message, and conveying the compressed digital outgoing signals to the processor. The integrated telephone controller still further comprises bus means coupled to the processor multiple-bit port and the memory interface means multiple-bit port for coupling the control means and the processor. The telephone network interface means, the handset interface means, the processor, the control means and the bus means are integrated in a single integrated circuit.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF THE PREFERRED EMBODIMENT

Figure 1:
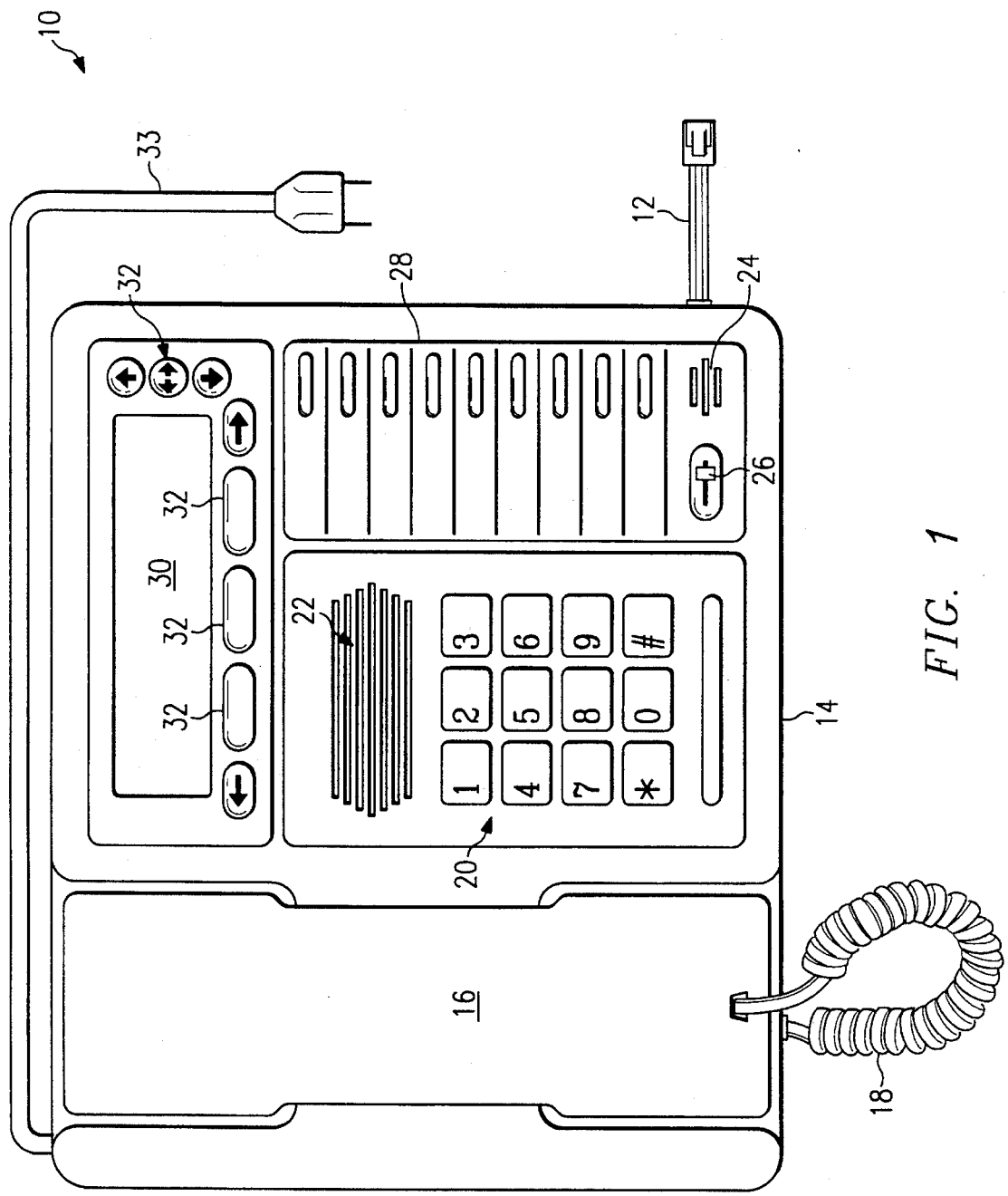
FIG. 1 is an illustration of a telephone device in which the present invention may be used.

FIG. 1 is an illustration of a telephone device 10 in which the present invention may be used. The telephone device 10 is coupled to a telephone line 12. The telephone line 12 conveys incoming telephone signals from and outgoing telephone signals to the commercial telephone network. The telephone signals may include signals representative of speech and signals representative of data. The telephone device 10 includes a base unit 14 and a handset 16 coupled to the base unit 14 by a cord 18.

The base unit 14 includes a keypad 20 including a first plurality of keys. The base unit 14 preferably further includes a speakerphone speaker 22, a speakerphone microphone 24, and a speakerphone switch 26. The speakerphone switch 26 allows the user to selectively activate the speakerphone speaker 22 and the speakerphone microphone 24 for hands-free operation of the telephone device 10. The base unit 14 further includes function keypad 28, including a second plurality of keys. These keys may be independently programmed, for example, to cause the telephone device 10 to dial a predetermined number. Alternatively, where the telephone device 10 implements a digital answering machine, these keys may control the function of the digital answering machine, such as outgoing message recording and incoming message playback. Where the telephone device 10 implements a speakerphone, one or more of these keys may control a programmable attenuator for varying the volume of sound from the speakerphone speaker 22 or the sensitivity of the speakerphone microphone 24.

The base unit 14 preferably further includes a display 30 and soft keys 32. The display may provide visual information to the user, such as date and time, the number dialed for an outgoing telephone call, or the origin of an incoming call. Also, in conjunction with the soft keys 32, the display 30 may display information in accordance with the analog display services interface (ADSI) protocol. In accordance with this protocol, data is received over the telephone line 12, along with voice information. The data may be in the form of dual tone, multiple frequency (DTMF) tones. Responsive to the received data, the telephone device 10 may display a portion of the data on the display 30. Further responsive to the received data, the soft keys 32 may be programmable, producing an output the effect of which is determined by the received data.

The telephone device 10 is preferably coupled to a line cord 33 for receiving alternating current (AC) power from a wall receptacle or other source. The AC power is converted to DC power for operating the telephone device 10. In the event of a power failure, the telephone device 10 may preferably be powered by the operating voltage supplied on telephone line 12.

The telephone device 10 preferably operates in any one of several operation modes. Active mode occurs whenever the telephone or answering machine functions are being used. When the telephone device 10 is not being actively used, it is in shutdown mode. In POTS ("plain old telephone service") mode, the telephone device 12 is powered by the telephone line 12. In in-circuit emulation mode, an external in-circuit emulator operates in place of the on-chip microcontroller.

Figure 2A:
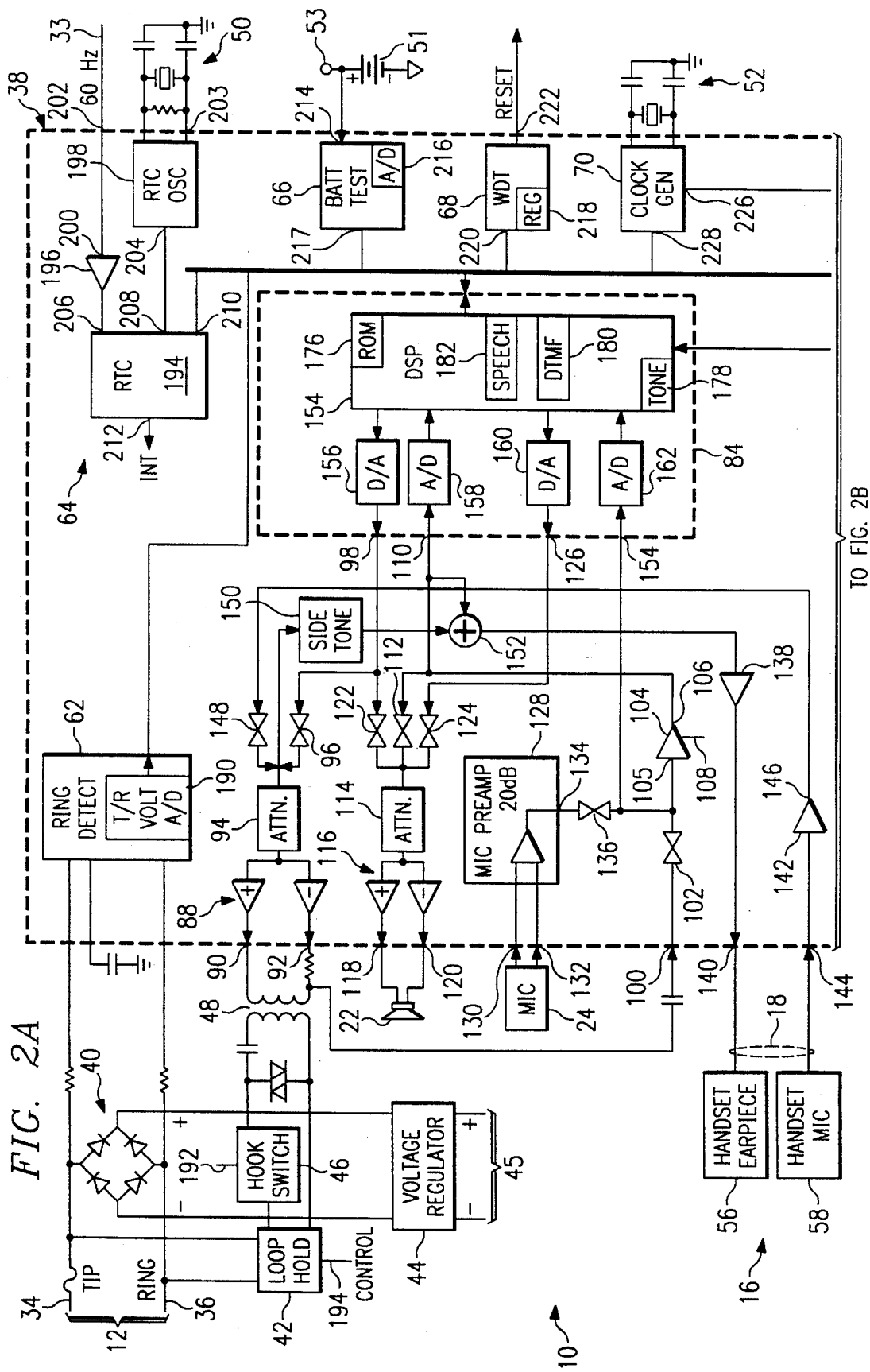
FIGS. 2A and 2B illustrate a detailed block diagram of a telephone device embodying the present invention.
Figure 2B:
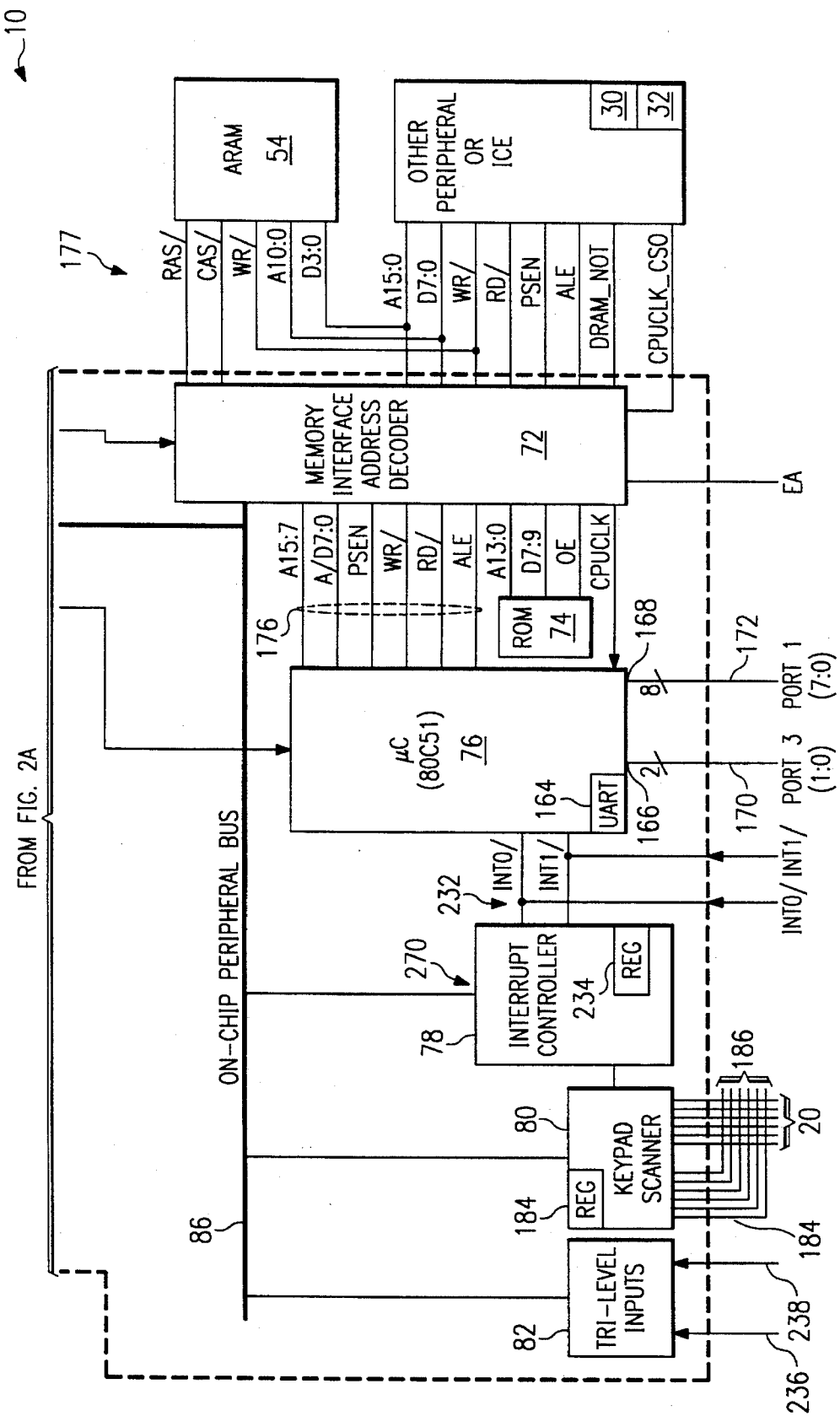

Turning now to FIGS. 2A and 2B a block diagram of the telephone device 10 of FIG. 1 and embodying the present invention is illustrated. The device 10 generally includes a telephone controller 38, a bridge rectifier 40 and a loop hold circuit 42. The telephone device 10 further includes a voltage regulator 44, a hook switch 46, a transformer 48, a real-time clock crystal oscillator 50, a clock generator crystal oscillator 52, and an audio RAM 54. The telephone device 10 may also be coupled to other peripheral devices, such as the display 30 and soft keys 32. The telephone device 10 still further includes a handset earpiece 56 and a handset microphone 58 within the handset 16 and coupled to the telephone controller 38 by the cord 18. The telephone device 10 still further includes keypad 20, speakerphone speaker 22 and speakerphone microphone 24.

The rectifier 40 and the voltage regulator 44 generate DC power to power the telephone device 10 in the event AC power is not available. The DC power is provided at the terminals 45 of the voltage regulator 44. Battery backup is provided by a battery 51 which provides a DC voltage at terminal 53.

In accordance with the present invention, the telephone controller 38 is preferably fabricated in a single integrated circuit. The telephone controller 38 preferably includes a ring detector 62, a real-time clock means 64, a battery monitor 66, a watchdog timer 68, a clock generator 70, a memory interface 72, a read-only memory 74, a microcontroller 76, an interrupt controller 78, a keypad scanner 80, tri-level inputs 82, a digital signal processor circuit 84, and an interface bus 86. The ring detector 62, the real-time clock means 64, the battery monitor 66, the watchdog timer 68, the clock generator 70, the memory interface 72, the microcontroller 76, the interrupt controller 78, the keypad scanner 80, the tri-level inputs 82, and the digital signal processor circuit 84 are all coupled to the interface bus 86 for conveying data and control signals.

The telephone controller 38 further includes an output amplifier 88, coupled to outputs 90 and 92, and programmable attenuator 94 and switch 96. The switch 96 may be a CMOS transfer gate or other device for selectively coupling the programmable attenuator 94 to an output 98 of the digital signal processor circuit 84. The switch 96 is responsive to control signals provided by the microcontroller 76 over the interface bus 86. These control connections are not shown in FIGS. 2A and 2B, so as not to unduly complicate the drawing figure.

The outputs 90 and 92 are coupled to the transformer 48, which is coupled to the telephone line 12 by the loop hold circuit 42. Thus, the output amplifier 88, the programmable attenuator 94 and the switch 96 form a telephone network transmitter means for transmitting outgoing electrical signals to the telephone network.

The transformer 48 is also coupled to an input 100 of the telephone controller 38. A switch 102 is coupled to the input 100 for selectively coupling the input 105 of an input amplifier 104 to the input 100, responsive to a control signal received from the microcontroller 76. The input amplifier 104 is preferably an automatic gain control amplifier, and includes an input 108 for providing automatic gain control. A feedback network, including resistors or capacitors, for the automatic gain control amplifier 104 may be located off-chip, separate from the telephone controller 38. The telephone controller 38 may include additional input or output connections for coupling the feedback network to the input 108. The output 106 of the input amplifier 104 is coupled to an input 110 of the digital signal processor circuit 84. The switch 102 and the input amplifier 104 thus form a telephone network receiver means for receiving incoming electrical signals from the telephone network.

The output 106 of the input amplifier 104 is also coupled to a switch 112. The switch 112 selectively couples the input amplifier 104 to a programmable attenuator 114, responsive to control signals received from the microcontroller 76. The programmable attenuator 114 is coupled to an output amplifier 116, which is coupled to outputs 118 and 120. The speakerphone speaker 22 is coupled to the outputs 118 and 120. The programmable attenuator 114 is also coupled to a switch 122, which selectively couples the programmable attenuator to the output 98 of the digital signal processor circuit 84, responsive to control signals received from the microcontroller 76. The programmable attenuator 114 is also connected to a switch 124, which selectively couples the programmable attenuator 114 to an output 126 of the digital signal processor circuit 84. The output amplifier 116, the programmable attenuator 114, the switch 122, the switch 112 and the switch 124 thus form speaker driver means for conveying speaker electrical signals to the speakerphone speaker.

The telephone controller 38 further includes a microphone preamplifier 128. The microphone preamplifier 128 is coupled to inputs 130 and 132, which are coupled to the speakerphone microphone 24. The output 134 of the microphone preamplifier is coupled through a switch 136 to the input 105 of the input amplifier 104. The microphone preamplifier 128 and the switch 136 thus form a microphone receiver means for conveying microphone electrical signals from the speakerphone microphone to the telephone network transmitter means. The switch 136 also selectively couples the output 134 of the microphone preamplifier 128 to an input 154 of the digital signal processor circuit 84.

The telephone controller 38 further includes an earpiece driver 138. The output of the earpiece driver 138 is coupled to an output 140. The handset earpiece 56 is coupled to the output 140. The telephone controller 38 further includes a microphone receiver 142 coupled to an input 144. The handset microphone 58 is coupled to the input 144. The output 146 of the microphone receiver 142 is coupled to a switch 148. The switch 148 selectively couples the output 146 of the microphone receiver 142 to the programmable attenuator 94 and to a sidetone generator 150. The sidetone generator 150 and a summer 152 combine electrical signals received from the handset microphone 58 with electrical signals received from the telephone line 12 by the input amplifier 104 and convey the signals to the earpiece driver 138. Addition of sidetone to incoming electrical signals is well known in the art for improving the comfort level of the user.

In accordance with the present invention, the digital signal processor circuit 84 includes a single digital signal processor 154. The digital signal processor circuit 84 further includes a first digital-to-analog converter 156, a first analog-to-digital converter 158, a second digital-to-analog converter 160 and a second analog-to-digital converter 162.

The microcontroller 76 is preferably an 80C51-type microcontroller. The 80 C51 microcontroller is an industry standard microcontroller, well known in the art. An important advantage is provided by use of the 80C51 microcontroller. Since the 80C51 microcontroller is well known, the development of program instructions to control the microcontroller 76 and, in turn, to control the telephone controller 38, is simplified. This minimizes product development cost and time to market, both of which are important in the development of consumer products such as telephone devices. The microcontroller 76 preferably includes a universal asynchronous receiver-transmitter (UART) 164. When the telephone controller 38 is operated as an ADSI controller, the UART 164 extracts useful data from the information decoded by the digital signal processor circuit 84. The microcontroller 76 also includes a first port 166 and a second port 168. These ports are connected to ports 170 and 172, respectively, of the telephone controller 38. The first port 166 may serve as input and output pins for the universal asynchronous receiver-transmitter 164.

The microcontroller 76 is coupled to the memory interface 72 by a bus 176. The memory interface 72 couples the microcontroller 76 with the interface bus 86, with the audio RAM 54, the ROM 74 and with other peripheral devices, such as the display 30 and soft keys 32. The memory interface 72 also serves as a DRAM controller for the audio RAM 54. The memory interface is coupled to the audio RAM 54 by a memory bus 177.

The audio RAM 54 preferably is a commercially available dynamic random access memory (DRAM) having a predetermined number of non-functioning storage locations, or bad bits. These bad bits may return a data value different from the value previously stored there. The data to be stored in the audio RAM 54 is digital data representative of speech, and is preferably compressed data. Since the data stored in the audio RAM 54 is decompressed upon playback, and since the bandwidth of telephone signals is narrow, some bad bits returning incorrect data will not significantly reduce audio quality upon playback. In addition, the use of audio-quality RAM for the audio RAM 54 provides a cost savings, in that a DRAM chip with some bad bits can be purchased at lower cost than a fully functional DRAM. This cost savings is important in the manufacture of consumer products, such as telephone devices.

The digital signal processor circuit 84 performs speech compression and decompression, tone generation, speech synthesis, and detection of dual tone, multiple frequency (DTMF) tones. The digital signal processor 154 preferably operates responsive to a predetermined program of instructions. The program of instructions are preferably stored in a read-only memory 176. For speech compression and synthesis, the microcontroller 76 handles the movement of data to and from the audio RAM 54 by means of the memory interface module 72.

The analog-to-digital converter 158 receives audible inputs, including voice and tone inputs, from the telephone line 12. The second analog-to-digital converter 162 receives audible inputs from the speakerphone microphone 24. The first analog-to-digital converter 158 and the second analog-to-digital converter 162 convert speech in the form of analog electrical signals to digital data, in a manner well known in the art.

For compression, the digital signal processor 154 compresses the digitized speech received from either the first analog-to-digital converter 158 or the second analog-to-digital converter 162. One example of a compression algorithm is the VSELP (Vector Sum Excited Linear Prediction) algorithm. Any suitable algorithm may be used. This algorithm is implemented as a predetermined program of instructions which control the digital signal processor 154. Where the audio RAM 54 consists of a single 4-megabit RAM chip, 10 to 15 minutes of record time may be achieved using the VSELP compression algorithm.

For decompression, the digital signal processor 154 receives over the interface bus 86 compressed data from the audio RAM 54. The compressed data are decompressed in accordance with a decompression algorithm, for example, the VSELP algorithm. Decompressed data are supplied to the first digital-to-analog converter 156 or the second digital-to-analog converter 160. The first digital-to-analog converter 156 converts the digital data to analog signals representative of an audible output and provides the analog signals to switches 96 and 122. Responsive to control signals from the microcontroller 76, the switches convey the analog signals to the speakerphone speaker 22 or to the telephone line 12. The second digital-to-analog converter 160 converts digital data to analog signals representative of an audible output and provides the analog signals to switch 124, which conveys the analog signals to the speakerphone speaker 22. The read-only memory 136 preferably stores instructions for controlling the digital signal processor in implementing the algorithm for compression and decompression.

The digital signal processor 154 preferably includes one or more tone generators 178. The tone generators 178 may provide DTMF tones, dial tones or busy tones. Where more than one tone generator is used, each tone generator preferably has an individually programmable amplitude output. These outputs may be summed together and provided to either the first digital-to-analog converter 156 or the second digital-to-analog converter 160, allowing for programmable twist.

The digital signal processor 154 also includes a DTMF detector 180. Preferably, the DTMF detector can operate simultaneously with the compression and expansion operation. This allows detection of DTMF tones during recording of an incoming message or during playback of an outgoing message when the telephone controller functions as a digital answering machine.

The digital signal processor 154 still further includes a speech synthesizer 182. Synthesized speech may be used for automatically providing the time and date a message is recorded or for prompting the user. The speech synthesizer uses data stored in read-only memory 176 for synthesizing speech sounds.

When receiving data in accordance with the ADSI protocol, the digital signal processor 154 functions as the receiving portion of a modem. The ADSI data are transmitted over telephone line 12 in a first data format, for example, in a frequency shift keying (FSK) format. The digital signal processor 154 performs the functions of a modem, such as a Bell 212A receive modem, to decode the FSK signals into digital data in a second data format used by a universal asynchronous receiver-transmitter (UART), including, for example, start bits, stop bits and parity bits. The digital signal processor 154 provides this data to the microcontroller 76. The UART 164 of the microcontroller 76 interprets this data and extracts the data in a third data format, for example as an 8-bit byte of data, for controlling the telephone device 10 as an ADSI terminal, for example, by displaying a portion of the extracted data.

The keypad scanner 80 includes a plurality of inputs 184 and a plurality of outputs 186 for coupling to the keypad 20. When a key on the keypad 20 is depressed or released, the keypad scanner 80 generates an interrupt on the interface bus 86 to prompt the microcontroller 76 to interrogate the keypad scanner 80 to identify the depressed key. The keypad scanner 80 includes a keypad status register 184. When a key is depressed, the keypad scanner stores in the keypad status register a unique code identifying the depressed key. This code may be read over the interface bus 86 by the microcontroller 76 to determine which key was depressed and produce a suitable response.

The ring detector 62 generates an interrupt signal on the interface bus 86 when a ring is detected on the telephone line 12. The ring detector 62 includes a tip/ring voltage analog-to-digital converter 190. The tip/ring voltage analog-to-digital converter 190 measures the potential difference between the tip conductor 34 and the ring conductor 36 and produces digital data representative of this potential difference. The digital data is supplied to the microcontroller 76 over the interface bus 86. From the digital data, the microcontroller can determine when an extension goes off-hook.

The hook switch 46 indicates when the handset 16 has been lifted off-hook. When the handset is off-hook, tip 34 and ring 36 are coupled to form a loop, causing current to flow in the loop. The hook switch 46 provides a control signal at output 192. This control signal is preferably coupled to the port 172 of the telephone controller 38 for indicating to the microcontroller 76 when the telephone device 10 is off-hook.

The loop hold circuit 42 functions to electronically lift the handset to connect the tip conductor 34 and the ring conductor 36. The telephone central office, monitoring the telephone line 12, detects DC current flow through the tip 34 and ring 36 conductors and determines that the telephone device 10 is off-hook. The loop hold circuit 42 has a control output 194, which is preferably coupled to the port 172 of the telephone controller 38.

The operation of the telephone device 10 as a standard telephone will now be described. When an incoming call is received by the telephone device 10, a ringing signal is detected by the ring detector circuit 62 and an interrupt is generated to the microcontroller 76. If the handset is lifted before a prescribed number of rings, the telephone device 10 operates as a telephone. The telephone line 12 is coupled through the loop hold circuit 42 to the transformer 48. Incoming electrical signals are received by the telephone controller 38 at input 100 and coupled through the switch 102 to the input amplifier 104. The input amplifier 104 provides the incoming electrical signals to the summer 152, which supplies the incoming signals plus a sidetone signal to the earpiece driver 138. The earpiece driver drives the handset earpiece 56, which produces an audible output. An audible input, such as speech, is converted by the handset microphone 58 to outgoing electrical signals, which are supplied to the microphone receiver 142. The microphone receiver 142 is coupled to the programmable attenuator 94 by the switch 148. The programmable attenuator 94 responds to control signals from the microcontroller 76 to selectively amplify or attenuate the outgoing electrical signals. The programmable attenuator 94 couples the outgoing electrical signals to the output amplifier 88 which conveys the outgoing electrical signals to the transformer 48 for coupling to the telephone line 12. The sidetone generator 150 couples a portion of the outgoing electrical signals received from the switch 148 to the summer 152.

In the case of an outgoing telephone call, the telephone device 10 operates as a basic telephone under the control of the microcontroller 76. When the handset 16 is lifted, the hook switch 46 generates an interrupt at the output 192. In response to a control signal received from the microcontroller 76 at the control input 194, the loop hold circuit 42 is activated to seize the loop. The user dials using the keypad, and in response to keypad activity, the microcontroller 76 establishes the appropriate signal path to place DTMF tones generated by the digital signal processor 154 on the telephone line 12, and to convey the DTMF tones to the earpiece 56. When the user hangs up, the microcontroller 76 directs the loop hold circuit 42 to release the loop.

The operation of the telephone device 10 as a digital answering machine to receive an incoming telephone call will now be described. Ringing signals on the telephone line 12 are detected by the ring detector 62 which conveys an interrupt signal to the microcontroller 76. If the handset is not lifted before a prescribed number of rings, the unit operates as a digital answering machine. The microcontroller 76 provides a control signal to the loop hold circuit 42 to cause the loop hold circuit 42 to seize the loop. Under control of the microcontroller 76, the memory interface 72 retrieves the compressed digital outgoing message from the audio RAM 54 and conveys it to the digital signal processor 154. The digital signal processor 154 decompresses the compressed digital outgoing message to produce a digital outgoing message, and conveys the digital outgoing message to the first digital-to-analog converter 156. The first digital-to-analog converter 156 converts the digital outgoing message to electrical signals representative of speech. The switch 96 couples the first digital-to-analog converter 156 to the programmable attenuator 94, which conveys the electrical signals to the output amplifier 88, which conveys the outgoing message to the telephone line. After the outgoing message is played, the tone generator 178 in the digital signal processor 154 generates a beep tone that is routed to the telephone line to indicate that the user may begin recording an incoming message.

The audible input forming the incoming message is conveyed from the telephone line 12 to the transformer 48 and conveyed to the input 100. The switch 102 couples the input 100 to the input amplifier 104 which conveys the incoming message to the first analog-to-digital converter 158. The first analog-to-digital converter converts the electrical signals representative of the audible input to digital data representative of the audible input and conveys the digital data to the digital signal processor 154. The digital signal processor compresses the digital data to produce a compressed digital incoming message. The memory interface 72 receives the compressed digital incoming message from the digital signal processor 154 and stores the compressed digital incoming message in the audio RAM 54. The speech synthesizer 182 may provide a time and date stamp with the digital incoming message which is also compressed and stored with the compressed digital incoming message in the audio RAM 54.

The operation of the telephone device 10 in a remote message playback and DTMF detection mode will now be described. In this mode, the user is listening to a recorded message from a remote telephone. The incoming call is answered by the telephone device 10 as described above. At any time after seizure of the loop, and perhaps during playback of the outgoing message, the caller may input DTMF tones indicating that the caller wishes to listen to stored messages. The DTMF tones are received from the telephone line at the input 100, coupled through the switch 102 to the input amplifier 104 and conveyed to the analog-to-digital converter 158. The digital signal processor 154 receives the DTMF tones and the DTMF detector 180 detects the DTMF tones and converts them to digital data. The digital signal processor 154 conveys the digital data to the memory interface 72. The DTMF tones may form a predetermined code to which the microcontroller 76 responds by playing back a recorded message.

The operation of the telephone device 10 for local message playback will now be described. In this case, the user is listening to a recorded message. To begin this operation, the user presses a message playback switch, which may be part of the function keypad 28 of the base unit 14 (FIG. 1). The message playback switch generates an interrupt to the microcontroller 76. In response to the microcontroller 76, the memory interface 72 conveys the compressed digital incoming message from the audio RAM 54 to the digital signal processor 154. The digital signal processor 154 decompresses the compressed digital incoming message to produce digital data and conveys the digital data to the second digital-to-analog converter 160. The second digital-to-analog converter 160 converts the digital data to electrical signals representative of an audible output. The switch 124 couples the second digital-to-analog converter 160 to the programmable attenuator 114. The programmable attenuator 114 may be responsive to control signals received from the microcontroller 76 for amplifying or attenuating the electrical signals. The microcontroller 76 may respond to the depressing of one or more keys on the function keypad 28, for example, to adjust the volume or tone of the electrical signals. The programmable attenuator 114 conveys the electrical signals to the output amplifier 116 for playing the message to the speakerphone speaker 22.

The operation of the telephone device 10 for recording an outgoing message will now be described. Here, the user is recording the message that will be played out over the telephone line when the telephone device 10 operates in answering machine mode. To begin the operation, the user presses and holds an outgoing message record switch, which may be located on the function keypad 28. In response to the outgoing message record switch, an interrupt is generated to the microcontroller. An audible input, such as speech, is received by the speakerphone microphone 24 and converted to electrical signals representative of the audible input. The electrical signals are coupled by the microphone preamplifier 128 through the switch 136 to the second analog-to-digital converter 162. The second analog-to-digital converter 162 converts the electrical signals to digital data representative of an audible input and conveys digital data to the digital signal processor 154. The digital signal processor 154 compresses the digital signals to produce a compressed digital outgoing message. The digital signal processor 154 conveys the compressed digital outgoing message over the interface bus 86 to the memory interface 72, which stores the compressed digital outgoing message in the audio RAM 54.

The operation of the telephone device 10 for receiving and displaying ADSI information and for providing ADSI output will now be described. In this case, the telephone device 10 receives over the telephone line 12 ADSI data for display on the display 30 (FIG. 1). The telephone device 10 may also receive voice information as well. Also, the soft keys 32 may be used for data entry, the data being conveyed over the telephone line to a remote location.

The ADSI data is received at the input 100 and conveyed through the switch 102 to the input amplifier 104. The input amplifier 104 conveys the data to the first analog-to-digital converter 158 where the data is converted from electrical signals representative of an audible input to digital data representative of an audible input. The analog-to-digital converter 158 conveys the digital data to the digital signal processor 154, where the DTMF detector 180 detects the DTMF tones which form the data. The digital data is conveyed over the interface bus 86 to the memory interface 72. The microcontroller 76 may respond to the data by displaying a portion of the data on the display 30. The microcontroller 76 may also respond to the data by storing a portion of the data in the audio RAM 54. Still further, the microcontroller 76 may respond to the data by programming the soft keys 32.

The soft keys 32 are preferably a plurality of programmable keys which produce a plurality of output signals. When the microcontroller 76 programs the programmable keys, the microcontroller 76 establishes a plurality of predetermined responses, each predetermined response of the plurality of predetermined responses corresponding to one output signal of the plurality of output signals. One or more of the responses of the plurality of predetermined responses may correspond to conveying data from the telephone controller 38 to the telephone line 12. In that case, the data are conveyed from the memory interface 72 over the interface bus 86 to the digital signal processor 154. The tone generator 178 of the digital signal processor 154 generates DTMF tones corresponding to the data to be conveyed to the telephone line 12. The digital signal processor 154 conveys the tone data to the first digital-to-analog converter 156. The first digital-to-analog converter 156 converts the digital data to electrical signals representative of an audible output and conveys the electrical signals through the switch 96 to the programmable attenuator 94, which conveys the signals through the output amplifier 88 to the telephone line 12.

A telephone controller in accordance with the present invention includes several features which enhance the convenience and robustness of the system. The telephone controller 38 includes a real-time clock means 64. The real-time clock means operates from the normal supply voltage provided at the terminals 45 of the voltage regulator 44 for the telephone controller 38 when the telephone controller 38 receives the supply voltage. The real-time clock means 64 operates from a dedicated battery when power is removed from the telephone controller. The clock input to the real-time clock means comes from either the 60 Hz AC power received from the power line cord 33 coupled to the telephone device 10 or from a crystal oscillator, preferably having an oscillation frequency of 262.144 KHz. The crystal oscillator provides timing for the DRAM controller function of the memory interface module 72 when the telephone controller 38 is in shutdown mode, that is, when the telephone and answering machine are not being actively used.

The real-time clock means 64 includes a real-time clock generator 194, a line frequency receiver 196 and a real-time clock oscillator 198. The line frequency receiver 196 has an input 200 coupled to an input 202 of the telephone controller 38 for receiving the 60 Hz power line frequency from the line cord 33. The real-time clock oscillator 198 is coupled to inputs 203 of the telephone controller 38 for receiving oscillator signals from the real-time clock crystal oscillator 50, located off-chip from the telephone controller 38. The real-time clock generator 194 operates in response to a 1 Hz clock received at either input 206, from the line frequency receiver 196, or at input 208, from the real-time clock oscillator 198. The real-time clock generator 194 has a port 210 coupled to the interface bus 86. The real-time clock generator 194 preferably provides the year, the month, hours, minutes and seconds, with data reported in either binary or binary coded decimal. The time and date can be initialized through software writes to the real-time clock generator 194, over the interface bus 86 to the port 210. The real-time clock generator 194 updates the time and date once each second, in response to the 1 Hz clock signals received at either input 206 or input 208. The current time and date can be read from the real-time clock generator 194 over the interface bus 86. The real-time clock generator 194 also has an interrupt output 212 for providing interrupt signals to the interrupt controller 78.

The battery monitor 66 is coupled to an input 214 of the telephone controller 38. The input 214 is adapted to be coupled to a depletable energy source, such as battery 51. The battery monitor 66 preferably includes an analog-to-digital converter 216 for detecting the battery voltage received at the input 214 and converting the received voltage to a digital value. The battery monitor 66 further includes a port 217 for supplying the digital value representative of the detected battery voltage to the interface bus 86. The microcontroller 76 can receive the digital value over the interface bus 86 for monitoring the voltage level of the battery. The analog-to-digital converter 216 is preferably a 4-bit analog-to-digital converter.

The robustness of the telephone controller 38 is further enhanced by the watchdog timer 68. The watchdog timer 68 provides a measure of system integrity by detecting if the program instructions which control the microcontroller 76 become hung up or lost. If such a condition is detected, the watchdog timer 68 generates a hardware reset to the telephone controller 38 as well as the rest of the telephone device 10. Preferably, a hardware reset is generated if an internal counter within the watchdog timer 68 is not cleared approximately every 2 seconds. The counter is cleared by the microcontroller 76 writing a specific code sequence to a register 218 within the watchdog timer 68.

The watchdog timer 68 includes a port 220 coupled to the interface bus 186 and an output coupled to the reset output 222 of the telephone controller 38. The watchdog timer 68 generates a reset signal in the form of a pulse at the reset output 222 if the watchdog timer 68 times out. The reset signal causes the telephone controller 38 to return to a predetermined condition. The timeout value is preferably approximately 2 seconds. A specific key sequence must be written by the microcontroller 76 to the watchdog timer register 218 within this 2 second interval following a reset condition, and within a 2 second interval following the previous update, to prevent timeout.

The key sequence is a 2-stage function starting from reset. The watchdog timer 86 starts in stage 1, waiting for a write to the watchdog timer register 218. If the value written by the microcontroller 76 to the watchdog timer register 218 is anything but a predetermined value, such as hexadecimal value A5, a system reset is generated by the watchdog timer 68 at the output 222. If the value written to the watchdog timer register 218 was the predetermined value, such as hexadecimal value A5, stage 2 is entered. In stage 2, the watchdog timer waits for another write to the watchdog timer register 218. If the write is a second predetermined value, such as the hexadecimal value 5A, the timer 68 is reset and stage 1 is re-entered. If the write is something other than the second predetermined value, a system reset is generated at the output 222.

The clock generator 70 is coupled to clock generator inputs 224 for receiving clocking signals from the clock generator crystal oscillator 52. In response to these received clocking signals, the clock generator 70 generates system clock signals. The clock generator 70 includes an output 226 coupled to the memory interface 72 for providing clocking signals to the memory interface 72. The clock generator 70 further includes a port 228 coupled to the interface bus 86 for communicating with the microcontroller 76. Preferably, the microcontroller can select the frequency of the system clock signals generated by the clock generator 70 by appropriate communications over the interface bus 86. The microcontroller can shut down the clock generator 70 to place the telephone controller 38 in shutdown mode to conserve power.

The interrupt controller 78 functions to gather interrupt requests from the various interrupt sources, internal and external to the telephone controller 38, and to generate an interrupt to the microcontroller 76. The interrupt controller 78 includes a plurality of inputs 230 coupled to other elements of the telephone controller 38, such as the keypad scanner 80, the ring detector 62 and the real-time clock means 64. In response to an interrupt received at one of the inputs 230, the interrupt controller 78 stores a value in register 234 indicating the source of the interrupt. The interrupt controller 78 further includes outputs 232 coupled to the microcontroller 76 for indicating to the microcontroller 76 the existence of an interrupt condition. In response to the indication of an interrupt condition, the microcontroller 76 reads the contents of the interrupt status register 234 over the interface bus 86 to determine the source of the interrupt.

The tri-level inputs 82 includes a first input 236 and a second input 238. These inputs can detect three distinct input states, high, low and open circuit. The detected state of each of the inputs is reported by the tri-level input circuit 82 to the interrupt controller 78. For example, one of the inputs 236 or 238 could be coupled to a ringer switch on the telephone device 10, to select ringer volume level including high, low and off settings. As another example, input 238 could be coupled to a switch within the telephone device 10 which selects the predetermined number of rings provided by the telephone device 10 before an incoming call is automatically answered by the telephone device 10.

The operation of a telephone device 10 in accordance with the present invention is further enhanced by the provision of a number of operating modes for the telephone controller 38. These include an active mode, plain old telephone service or POTS mode, shutdown mode, in-circuit emulation mode, and off-chip ROM mode.

The telephone controller 38 is in active mode any time the clock generator 70 is running. Active mode is used whenever the telephone device 10 functions as a telephone or answering machine. In active mode, all functional blocks of the telephone controller 38 may be used to their full capacity.

While power consumption of the telephone controller 38 is inherently low, the telephone controller preferably includes several features designed to further reduce power consumption of the telephone. For example, all of the functional blocks of the telephone controller 38, such as the ring detect 62, the real-time clock means 64, the battery monitor 66, the watchdog timer 68, the clock generator 70, the keypad scanner 80 and the digital signal processor circuit 84, can be activated and deactivated by software commands controlling the microcontroller 76. Further, the frequency of the clock signals generated by the clock generator 70 can be varied. Slower clock signals correspond to reduced power consumption. The clock generator can also be turned off completely. Still further, the clock generator 70 can be sped up automatically whenever an interrupt is received by the microcontroller 76. This allows for very low clock rates when no activity is occurring without sacrificing interrupt response time.

POTS mode is a special case of active mode, in which the clock generator 70 is on but the digital signal processor circuit 84 is clocked at a slow rate. POTS mode allows the telephone controller 38 to provide basic POTS functions by powering the telephone device 10 from the telephone line 12 if the AC power fails. In this mode, the earpiece driver 138, the microphone receiver 142, the sidetone generator 150, keypad scanner 80 and parallel ports 166 and 168 are active, the digital signal processor circuit 84 operates at a slow clock rate to provide DTMF dialing tones, and the microcontroller 76 is active at a slow clock rate to provide keypads, pulse dialing and other control functions. Answering machine functions are disabled in this mode.

Shutdown mode is the normal state that the telephone controller 38 is placed in when the telephone and answering machine functions are not being actively used. In shutdown mode, only the real-time clock means 64 and the DRAM refresh function of the memory interface 72 remain powered. Shutdown mode can be terminated by an external interrupt, such as keypad activity or ring detect, or by an interrupt from the real-time clock means 64.

In-circuit emulation mode allows an external in-circuit emulator to control operation of the telephone controller 38 in place of the on-chip microcontroller 76. In this mode, the microcontroller 76 is deactivated and the external in-circuit emulator controls the operation of the telephone controller 38. This mode is useful for writing and testing software instructions for use in controlling the microcontroller 76.

Off-chip ROM mode allows the microcontroller 76 to operate responsive to program instructions and data stored in an external memory device rather than instructions stored in the ROM 74.

As can be seen from the foregoing, the present invention provides a telephone controller for controlling operation of a telephone using a single digital signal processor to provide functions including a digital answering machine, a telephone, a speakerphone and compatibility with the analog display services interface. The telephone controller is integrated within a single integrated circuit. The single integrated circuit thus integrates both digital control functions as well as analog telephone line interface functions. Use of a single digital signal processor and integration within a single integrated circuit reduces cost of the telephone controller, reduces noise on analog signal paths and subsequent inaccuracies in digital signals, requires fewer components and interconnections and reduces power consumption.

While particular embodiments of the present invention have been shown and described, modifications may be made, and it is therefore intended to cover in the appended claims all such changes and modifications which fall within the true spirit and scope of the invention.

I claim:

1. A telephone controller for controlling a telephone and coupling the telephone to a telephone line, the telephone including a memory, speaker means for providing an audible output, and microphone means for receiving an audible input, the telephone controller comprising:

control means including a memory interface means for controlling storage in and retrieval of data from said memory, said memory interface means coupled to said memory by a memory bus, said memory interface means being coupled to an interface bus;

a digital signal processor for converting electrical signals representative of an audible input to digital data and for converting digital data to electrical signals representative of an audible output, said digital signal processor being coupled to said interface bus for communicating said digital data with said memory interface means;

telephone line interface means for coupling said digital signal processor to said telephone line for conveying said electrical signals representative of said audible input and audible output between said telephone line and said digital signal processor, for conveying said electrical signals representative of said audible output from said digital signal processor to said speaker means, and for conveying said electrical signals representative of said audible input from said microphone means to said digital signal processor; and user interface means for coupling said telephone line interface means to said speaker means and said microphone means, said control means, said digital signal processor, said telephone line interface means, said user interface means and said interface bus are integrated in a common integrated circuit.

2. A telephone controller as defined in claim 1 wherein said digital signal processor receives said electrical signals representative of said audible input from said telephone line interface means and said microphone means and converts said received electrical signals representative of said audible input to digital data representative of said audible input, and wherein said digital signal processor conveys said digital data representative of said audible input to said interface bus, said memory interface means receiving said digital data representative of said audible input and storing said digital data representative of said audible input in said memory.

3. A telephone controller as defined in claim 2 wherein said digital signal processor further includes compression means for compressing said digital data representative of said audible input to produce compressed data and conveying said compressed data to said interface bus, said memory interface means receiving said compressed data from said interface bus, said control means including processor means coupled with said memory interface means for combining said compressed data to form a compressed message, said memory interface means storing said compressed message in said memory.

4. A telephone controller as defined in claim 3 wherein said digital signal processor further includes decompression means for decompressing said compressed message to produce a playback message, said memory interface means receiving said compressed message from said memory and conveying said compressed message to said digital signal processor for decompression.

5. A telephone controller as defined in claim 4 wherein said digital signal processor includes DTMF detect means for detecting DTMF tones received from said telephone line.

6. A telephone controller as defined in claim 4 wherein said digital signal processor includes tone generator means for generating tones, said telephone line interface means conveying said tones from said digital signal processor to said telephone line.

7. A telephone controller as defined in claim 5 wherein said digital signal processor includes speech synthesizer means for generating synthesized speech signals, said telephone line interface means conveying said synthesized speech signals from said digital signal processor to said user interface means.

8. A telephone controller as defined in claim 6 wherein said tone generator means generates DTMF tones, a dial tone and busy tones.

9. A telephone controller as defined in claim 4 wherein the telephone includes a handset and a base unit, and wherein said microphone means includes a handset microphone in said handset and a speakerphone microphone in said base unit, and wherein said speaker means includes a handset earpiece in said handset and a speakerphone speaker in said base unit, and wherein said telephone further includes a speakerphone switch coupled to the telephone controller, said user interface means being responsive to said speakerphone switch for coupling said handset microphone and said handset earpiece to said telephone line interface means and for coupling said speakerphone microphone and said speakerphone speaker to said telephone line interface means.

10. A telephone controller as defined in claim 9 wherein the telephone includes display means for providing a visual display, said telephone line interface means receiving electrical signals representative of display information from said telephone line, said telephone line interface means conveying said electrical signals representative of display information to said digital signal processor, said digital signal processor converting said received electrical signals representative of display information to digital data representative of display information and conveying said digital data representative of display information to said interface bus, said memory interface means receiving said digital data representative of display information from said interface bus and conveying said digital data representative of display information to said display means for display.

11. A telephone controller as defined in claim 9 wherein said digital signal processor comprises digital to analog converter means for converting said digital data to said electrical signals representative of said output, said digital to analog converter means including a first digital to analog converter having a first output and a second digital to analog converter having a second output, and wherein said telephone line interface means is coupled to said control means, said telephone line interface means including first switch means responsive to said control means for coupling said first output to said telephone line and second switch means responsive to said control means for coupling said second output to said speakerphone speaker.

12. A telephone controller as defined in claim 11 wherein said digital signal processor comprises analog to digital converter means for converting said electrical signals representative of said input to said digital data, and wherein said analog to digital converter means includes a first analog to digital converter having a first input and a second analog to digital converter having a second input, and wherein said telephone line interface means includes third switch means responsive to said control means for coupling said first input to said telephone line and fourth switch means responsive to said control means for coupling said second input to said speakerphone microphone.

13. A telephone controller as defined in claim 12 wherein the telephone line communicates both electrical signals representative of said audible input and electrical signals representative of display information and wherein the telephone further comprises display means for providing a visual display, said third switch means coupling said first analog to digital converter to said telephone line interface means for receiving said electrical signals representative of display information, said first analog to digital converter converting said electrical signals representative of display information to display data representative of display information and conveying said display data to said control means.

14. A telephone controller as defined in claim 13 wherein said control means further comprises a universal asynchronous receiver-transmitter and wherein said digital signal processor converts said display data from a first data format to a second data format and conveys said display data having said second format to said universal asynchronous receiver-transmitter, said universal asynchronous receiver-transmitter converting said display data from said second data format to a third data format, said control means conveying a portion of said display data having said third data format to said display means.

15. A telephone controller as defined in claim 13 wherein said control means receives said display data from said first analog to digital converter and stores said display data in said memory.

16. A telephone controller as defined in claim 15 wherein the telephone further includes a plurality of programmable keys and wherein said control means is responsive to said display data for programming said programmable keys.

17. A telephone controller as defined in claim 16 wherein said plurality of programmable keys produces a plurality of output signals and wherein said control means programs said programmable keys by establishing a plurality of predetermined responses, each predetermined response of said plurality of predetermined responses corresponding to one output signal of said plurality of output signals.

18. A telephone controller as defined in claim 2 further comprising ring detector means for detecting a ringing signal on said telephone line, said ring detector means being coupled to said interface bus for conveying a ringing indication to said control means in response to detecting said ringing signal, said ring detector means being integrated in said common integrated circuit.

19. A telephone controller as defined in claim 18 wherein said ring detector means includes a tip/ring analog to digital converter means for detecting a voltage on said telephone line and providing an off-hook indication to said control means when said voltage does not exceed a predetermined threshold.

20. A telephone controller as defined in claim 2 wherein the telephone further includes a keypad having a plurality of keys, the telephone controller further comprising keypad scanner means for coupling to said keypad for generating keypad signals indicative of depression of one or more keys of said plurality of keys, said keypad scanner means being coupled to said interface bus for conveying said keypad signals to said memory interface means.

21. A telephone controller as defined in claim 2 further comprising real-time clock means for generating time signals, said real-time clock means being coupled to said interface bus for conveying said time signals to said control means, said real-time clock means being integrated in said common integrated circuit.

22. A telephone controller as defined in claim 21 wherein the telephone is powered by a periodic line voltage and wherein said real-time clock means includes line means for generating said time signals from said periodic line voltage.

23. A telephone controller as defined in claim 22 wherein the telephone includes crystal means for generating a periodic signal and wherein said real-time clock means further includes oscillator means for generating said time signals from said periodic signal.

24. A telephone controller as defined in claim 23 wherein said telephone controller is powered by a first energy source, said first energy source providing a first supply voltage to said telephone controller, the telephone further including a backup depletable energy source for supplying a backup supply voltage, and wherein said real-time clock means detects an amplitude of said first supply voltage, said real-time clock means operating responsive to said first supply voltage when said when said amplitude is greater than a predetermined threshold and said real-time clock means operating responsive to said backup supply voltage when said amplitude is at or below said predetermined threshold.

25. A telephone controller as defined in claim 21 wherein said control means generates time and date information responsive to said time signals and combines said time and date information with said digital data representative of said audible input to form a stored message, said memory interface means storing said stored message in said memory means.

26. A telephone controller as defined in claim 2 further comprising watchdog timer means for timing a predetermined time period and for generating reset signals for resetting said integrated telephone controller after elapse of said predetermined time period, said watchdog timer means being coupled to said bus means for conveying said reset signals to said control means, said watchdog timer means being integrated in said common integrated circuit.

27. A telephone controller as defined in claim 2 wherein the telephone controller is powered by a depletable energy source, said depletable energy source generating a battery voltage, and wherein said telephone controller further comprises battery level detector means for detecting said battery voltage and generating a battery voltage signal, said battery level detector means being coupled to said interface bus for conveying said battery voltage signal to said control means, said battery level detector means being integrated in said common integrated circuit.

28. A telephone controller as defined in claim 27 wherein said battery level detector means comprises a battery level analog to digital converter for detecting said battery voltage and generating said battery voltage signal.

29. A telephone controller as defined in claim 2 wherein the telephone controller further includes a general purpose input/output port coupled to said control means.

30. A telephone controller as defined in claim 29 wherein said control means includes a universal asynchronous receiver-transmitter and said general purpose input/output port includes an input and an output coupled to said universal asynchronous receiver-transmitter.

31. An integrated telephone controller for coupling a telephone to a telephone network and providing a digital answering machine adapted for storing a compressed digital outgoing message and one or more compressed digital incoming messages, the telephone network communicating electrical signals including incoming electrical signals and outgoing electrical signals, said telephone having microphone means including a handset microphone for converting audible input to said outgoing electrical signals and speaker means including a handset earpiece for converting said incoming electrical signals to an audible output, said telephone including memory means having a multiple-bit port, said memory means for storing said compressed digital outgoing message and said one or more compressed digital incoming messages, the integrated telephone controller comprising:

telephone network interface means for coupling the telephone controller to said telephone network, said telephone network interface means including telephone network receiver means coupled to said telephone network for receiving said incoming electrical signals from said telephone network and telephone network transmitter means coupled to said telephone network for transmitting said outgoing electrical signals to said telephone network;

handset interface means including earpiece driver means coupled between said telephone network receiver means and said handset earpiece for conveying said incoming electrical signals to said handset earpiece, and handset microphone receiver means coupled between said handset microphone and said telephone network transmitter means for conveying said outgoing electrical signals to said telephone network transmitter means;

a processor including first analog to digital converter means coupled to said telephone network receiver means for receiving said incoming electrical signals from said telephone network receiver means and converting said incoming electrical signals to digital incoming signals, a digital signal processor including compression means for compressing said digital incoming signals to produce compressed digital incoming signals and decompression means for decompressing compressed digital outgoing signals to produce digital outgoing signals, and first digital to analog converter means coupled between said digital signal processor and said telephone network transmitter means for converting said digital outgoing signals to said outgoing electrical signals and conveying said outgoing electrical signals to said telephone network transmitter means, said processor having a multiple-bit port for receiving said compressed digital incoming signals and for transmitting said compressed digital outgoing signals;

control means including memory interface means having a multiple-bit port coupled to said processor multiple-bit port, said memory interface means for receiving said compressed digital incoming signals, combining said compressed digital incoming signals to form said one or more compressed digital incoming messages and storing said one or more compressed digital incoming messages in said memory means, and receiving said compressed digital outgoing message from said memory means, forming said compressed digital outgoing signals from said compressed digital outgoing message, and conveying said compressed digital outgoing signals to said processor; and bus means coupled to said processor multiple-bit port and said memory interface means multiple-bit port for coupling said control means and said processor;

said telephone network interface means, said handset interface means, said processor, said control means and said bus means are integrated in a single integrated circuit.

32. An integrated telephone controller as defined in claim 31 wherein said microphone means further includes a speakerphone microphone and wherein said speaker means further includes a speakerphone speaker, and wherein the integrated telephone controller further comprises speakerphone interface means, said speakerphone interface means including microphone receiver means coupled between said speakerphone microphone and said telephone network transmitter means for conveying microphone electrical signals from said speakerphone microphone to said telephone network transmitter means, said speakerphone interface means further including speaker driver means coupled between said telephone network receiver means and said speakerphone speaker for conveying speaker electrical signals to said speakerphone speaker.

33. An integrated telephone controller as defined in claim 32 wherein said speakerphone interface means selectively couples said microphone receiver means to said first analog to digital converter means responsive to a control signal from said control means, and wherein said first analog to digital converter means converts said microphone electrical signals to microphone data, said memory interface means receiving said microphone data from said first analog to digital converter means and storing said microphone data in said memory means.

34. An integrated telephone controller as defined in claim 33 wherein said compression means compresses said microphone data to produce compressed microphone data, said memory interface means receiving said compressed microphone data and storing said compressed microphone data in said memory means.

35. An integrated telephone controller as defined in claim 34 wherein said compressed digital outgoing message includes a portion of said microphone data.

36. An integrated telephone controller as defined in claim 32 wherein said microphone receiver means comprises microphone amplifier means for amplifying said outgoing electrical signals.

37. An integrated telephone controller as defined in claim 36 wherein said telephone network interface means further comprises amplifier means and switch means for selectively coupling said amplifier means to said microphone amplifier means for amplifying said outgoing electrical signals or to said telephone network for amplifying said incoming electrical signals.

38. An integrated telephone controller as defined in claim 32 wherein said speaker driver means comprises speaker amplifier means for amplifying said incoming electrical signals.

39. An integrated telephone controller as defined in claim 38 wherein said telephone includes a speakerphone switch and wherein said speakerphone interface means further includes switch means for selectively coupling said telephone network interface means and said first digital to analog converter means to said speaker driver means, said switch means being responsive to said speakerphone switch.

40. An integrated telephone controller as defined in claim 39 wherein said telephone network interface means includes switch means for selectively coupling said first digital to analog converter means and said handset microphone receiver means to said telephone network transmitter means, said switch means being responsive to said speakerphone switch.

41. An integrated telephone controller as defined in claim 40 wherein said handset interface means includes sidetone means having a first input coupled to said telephone network transmitter means and a second input coupled to said telephone network receiver means and an output coupled to said earpiece driver means for supplying a sidetone signal to said handset earpiece.

42. An integrated telephone controller as defined in claim 32 wherein said incoming electrical signals include voice signals and display signals and said telephone includes display means for providing a visual display, and wherein said processor further comprises second analog to digital converter means for receiving said display signals and producing display data from said display signals, said control means receiving said display data and conveying a portion of said display data to said display means.

43. An integrated telephone controller as defined in claim 42 wherein said control means further comprises a universal asynchronous receiver-transmitter and wherein said processor converts said display data from a first data format to a second data format and conveys said display data having said second data format to said universal asynchronous receiver-transmitter, said universal asynchronous receiver-transmitter converting said display data from said second data format to a third data format, said control means conveying said portion of said display data having said third data format to said display means.

44. An integrated telephone controller as defined in claim 32 wherein said display includes a plurality of programmable keys and wherein said control means is responsive to said display data for programming said programmable keys.

45. An integrated telephone controller as defined in claim 44 wherein said plurality of programmable keys produces a plurality of output signals and wherein said control means programs said programmable keys by establishing a plurality of predetermined responses, each predetermined response of said plurality of predetermined responses corresponding to one output signal of said plurality of output signals.

46. An integrated telephone controller as defined in claim 32 wherein the telephone further includes keypad means including a plurality of keys and keypad signal means for generating keypad signals indicative of depressed keys, wherein said integrated telephone controller further comprises keypad interface means for receiving said keypad signals, said keypad interface means being coupled to said bus means for conveying said keypad signals to said control means, said keypad interface means being integrated in said single integrated circuit.

47. An integrated telephone controller as defined in claim 32 further comprising real-time clock means for generating time signals, said real-time clock means being coupled to said bus means for conveying said time signals to said control means, said real-time clock means being integrated in said single integrated circuit.

48. An integrated telephone controller as defined in claim 47 wherein said integrated telephone controller is powered by a first energy source, said first energy source providing a first supply voltage to said telephone controller, the telephone further including a backup depletable energy source for supplying a backup supply voltage, and wherein said real-time clock means detects an amplitude of said first supply voltage, said real-time clock means operating responsive to said first supply voltage when said amplitude is greater than a predetermined threshold and said real-time clock means operating responsive to said backup supply voltage when said amplitude is at or below said predetermined threshold.

49. An integrated telephone controller as defined in claim 48 wherein the telephone includes crystal means for generating a periodic signal and wherein said real-time clock means further includes oscillator means for generating said time signals from said periodic signal.

50. An integrated telephone controller as defined in claim 49 wherein said real-time clock means detects an amplitude of said periodic line voltage and wherein said line means generates said time signals when said amplitude is above a predetermined threshold and said oscillator means generates said time signals when said amplitude is at or below said predetermined threshold.

51. An integrated telephone controller as defined in claim 47 wherein said control means generates time and date information responsive to said time signals and combines said time and date information with said compressed digital signals to form said one or more compressed digital incoming messages for storing in said memory means.

52. An integrated telephone controller as defined in claim 32 further comprising watchdog timer means for timing a predetermined time period and for generating reset signals for resetting said integrated telephone controller after elapse of said predetermined time period, said watchdog timer means being coupled to said bus means for conveying said reset signals to said control means, said watchdog timer means being integrated in said single integrated circuit.

53. An integrated telephone controller as defined in claim 32 wherein the integrated telephone controller is powered by a depletable energy source, said depletable energy source generating a battery voltage, and wherein the integrated telephone controller further comprises battery level detector means for detecting said battery voltage and generating a battery voltage signal, said battery level detector means being coupled to said bus means for conveying said battery voltage signal to said control means, said battery level detector means being integrated in said common integrated circuit.

54. An integrated telephone controller as defined in claim 53 wherein said battery level detector means comprises a battery level analog to digital converter for detecting said battery voltage and generating said battery voltage signal.

* * * * *